United States Patent
Isobe et al.

(10) Patent No.: US 9,351,327 B2
(45) Date of Patent: May 24, 2016

(54) COMMUNICATION SYSTEM, PHONEBOOK SERVER, RADIO COMMUNICATION TERMINAL, AND COMMUNICATION METHOD (71) Applicant: NTT DOCOMO, INC., Tokyo (JP)

(72) Inventors: Shin-ichi Isobe, Tokyo (JP); Katsutoshi Nishida, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/395,078

(22) PCT Filed: Apr. 18, 2013

(86) PCT No.: PCT/JP2013/061513
§ 371 (c)(1),
(2) Date: Oct. 17, 2014

(87) PCT Pub. No.: WO2013/161673
PCT Pub. Date: Oct. 31, 2013

(65) Prior Publication Data
US 2015/0079976 A1 Mar. 19, 2015

(30) Foreign Application Priority Data

Apr. 25, 2012 (JP) ................................. 2012-100277

(51) Int. Cl.
| | |
|---|---|
| *H04W 4/00* | (2009.01) |
| *H04W 76/02* | (2009.01) |
| *H04M 3/42* | (2006.01) |
| *G06F 17/30* | (2006.01) |
| *H04W 64/00* | (2009.01) |
| *H04M 1/725* | (2006.01) |
| *H04W 8/00* | (2009.01) |
| *H04W 4/02* | (2009.01) |
| *H04W 88/06* | (2009.01) |
| *H04M 1/2745* | (2006.01) |
| *H04L 29/12* | (2006.01) |

(52) U.S. Cl.
CPC ............. *H04W 76/023* (2013.01); *G06F 17/30* (2013.01); *H04M 1/7253* (2013.01); *H04M 3/42* (2013.01);

(Continued)

(58) Field of Classification Search
CPC ... H04W 76/023; H04W 8/005; H04W 4/023; H04W 64/00; H04W 88/06; H04W 4/02; H04M 1/7253; H04M 3/42; H04M 1/274508; G06F 17/30; H04L 61/1594
USPC .................................. 455/426.1, 414.3, 426.2
See application file for complete search history.

(56) References Cited

U.S. PATENT DOCUMENTS 8,913,511 B2 * 12/2014 Geirhofer ............. H04W 52/08
370/252
2013/0013742 A1 * 1/2013 Kim ....................... G06Q 30/00
709/219

FOREIGN PATENT DOCUMENTS

| EP | 1333627 A1 | 8/2003 |
|---|---|---|
| EP | 2015607 A2 | 1/2009 |

(Continued)

OTHER PUBLICATIONS

International Search Report for corresponding International Application No. PCT/JP2013/061513, mailed Jun. 25, 2013 (2 pages).

(Continued)

*Primary Examiner* — Dhaval Patel
(74) *Attorney, Agent, or Firm* — Osha · Liang LLP (57) ABSTRACT

Provided are a communication system capable of causing a communication application to speedily find out whether D2D communication is possible or not. The phonebook server 300 includes a phonebook data acquisition unit 310 configured to acquire first phonebook data containing an identifier of a terminal 400B, a terminal location acquisition unit 320 configured to acquire a location of the terminal 400B contained in the first phonebook data acquired by the phonebook data acquisition unit 310, a phonebook data generation unit 330 configured to generate second phonebook data containing an identifier of a candidate terminal capable of direct communication, based on the location of the terminal 400B acquired by the terminal location acquisition unit 320, and a transmission unit 340 configured to send a terminal 400A the second phonebook data generated by the phonebook data generation unit 330.

5 Claims, 4 Drawing Sheets (52) U.S. Cl.
CPC .............. *H04W 4/023* (2013.01); *H04W 8/005* (2013.01); *H04W 64/00* (2013.01); *H04L 61/1594* (2013.01); *H04M 1/274508* (2013.01); *H04W 4/02* (2013.01); *H04W 88/06* (2013.01)

(56) References Cited

FOREIGN PATENT DOCUMENTS

| JP | 10-234078 A | 9/1998 |
|---|---|---|
| JP | 2005-12627 A | 1/2005 |
| JP | 2005-223722 A | 8/2005 |
| JP | 2008-263390 A | 10/2008 |
| JP | 2009-147791 A | 7/2009 |
| WO | 2006067281 A1 | 6/2006 |

OTHER PUBLICATIONS

Written Opinion for corresponding International Application No. PCT/JP2013/061513, mailed Jun. 25, 2013 (3 pages).

B. Bertenyi; "Key drivers for LTE success: Services Evolution;" 3GPP Seminar, LTE Asia; Sep. 6, 2011 (15 pages).

Extended European Search Report issued in the counterpart European Patent Application No. 13782078.3, mailed Nov. 17, 2015 (8 pages).

\* cited by examiner

COMMUNICATION SYSTEM, PHONEBOOK SERVER, RADIO COMMUNICATION TERMINAL, AND COMMUNICATION METHOD

TECHNICAL FIELD

The present invention relates to a communication system, a phonebook server, a radio communication terminal, and a communication method allowing radio communication terminals to execute direct communication with each other without involving a radio access network.

BACKGROUND ART

Conventionally, Bluetooth (registered trademark) and ad-hoc mode of a wireless LAN are known as so-called Device-to-Device (D2D) communication that is a radio communication method in which multiple radio communication terminals (sometimes referred to simply as terminals hereinbelow) perform radio communication with each other directly without involving a radio base station or an access point. Such a radio method achieves short-range radio communication by using relatively-low radio transmission power. For this reason, it is difficult to use this radio communication method when the inter-terminal distance is long. In addition, in such a radio communication method, the radio transmission capacity is limited compared to a radio access network (e.g., UTRA (3G), E-UTRA (LTE), or GERAN (2G)) managed by a telecommunications carrier.

Against this background, it is being discussed to achieve the D2D communication by using a radio access network provided by a telecommunications carrier (e.g., Non-patent document 1).

In the case of using a radio access technology employed in such a radio access network, the terminals uses a frequency band which the telecommunications carrier is licensed to use by supervisory authorities, and therefore are enabled to output higher radio transmission power and achieve long-distance, large-capacity D2D communication without using resources on the network side such as a radio base station. Such a characteristic is considered particularly effective when the network side such as the radio base station is devastated by an earthquake or the like. In addition, when the D2D communication is achieved using the frequency band used in a radio access network managed by a telecommunications carrier, the terminals can perform the D2D communication without being equipped with a module for another type of radio communication (e.g., Bluetooth (registered trademark)), which offers advantages such as cost and size reductions for the terminals.

PRIOR ART DOCUMENT

Non-Patent Document

Non-patent document 1: "Key drivers for LTE success: Services Evolution," September 2011, 3GPP, Internet URL: http://www.3gpp.org/ftp/Information/presentations/presentations_2011/2011_09_ LTE_Asia/2011_LTE-Asia_3GPP_Service_evolu tion.pdf

SUMMARY OF THE INVENTION

However, performing D2D communication by using the radio access network described above has the following problem. Specifically, when a communication application installed in the terminal tries to execute D2D communication, the communication application cannot find out if D2D communication can be executed with a communication counterpart terminal or not. For this reason, the terminal cannot effectively initiate D2D communication.

Thus, the present invention has been made in view of such circumstances and has an objective of providing a communication system, a phonebook server, a radio communication terminal, and a communication method capable of causing a communication application to speedily find out whether device-to-device direct communication (D2D communication) is possible or not in a case where the D2D communication is to be performed by using a radio access network such as LTE.

A first feature of the present invention is summarized as a communication system including: a radio communication terminal having a communication application installed therein and being capable of executing direct communication with another radio communication terminal without involving a radio access network; and a phonebook server configured to manage first phonebook data containing an identifier of the other radio communication terminal and being associated with the radio communication terminal. Here, the phonebook server includes a phonebook data acquisition unit configured to acquire the first phonebook data, a terminal location acquisition unit configured to acquire a location of the other communication terminal contained in the first phonebook data acquired by the phonebook data acquisition unit, a phonebook data generation unit configured to generate second phonebook data containing an identifier of a candidate terminal capable of direct communication, based on the location of the other radio communication terminal acquired by the terminal location acquisition unit, and a transmission unit configured to send the radio communication terminal the second phonebook data generated by the phonebook data generation unit. And, the radio communication terminal includes a phonebook data reception unit configured to receive the second phonebook data from the phonebook server, and a direct communication execution unit configured to execute direct communication with a counterpart terminal indicated in a communication request from the communication application, when the counterpart terminal is contained in the second phonebook data as the candidate terminal.

A second feature of the present invention is summarized as a phonebook server which manages first phonebook data associated with a radio communication terminal having a communication application installed therein and being capable of executing direct communication with another radio communication terminal without involving a radio access network, the phonebook server including: a phonebook data acquisition unit configured to acquire the first phonebook data containing an identifier of the other radio communication terminal; a terminal location acquisition unit configured to acquire a location of the other communication terminal contained in the first phonebook data acquired by the phonebook data acquisition unit; a phonebook data generation unit configured to generate second phonebook data containing an identifier of a candidate terminal capable of direct communication, based on the location of the other radio communication terminal acquired by the terminal location acquisition unit; and a transmission unit configured to send the radio communication terminal the second phonebook data generated by the phonebook data generation unit.

A third feature of the present invention is summarized as a radio communication terminal having a communication application installed therein and being capable of executing direct communication with another radio communication terminal without involving a radio access network, the radio communication terminal including: a phonebook data reception unit configured to receive the second phonebook data from the phonebook server, the second phonebook data containing an identifier of a candidate terminal capable of direct communication with the radio communication terminal; and a direct communication execution unit configured to execute direct communication with a counterpart terminal indicated in a communication request from the communication application, when the counterpart terminal is contained in the second phonebook data as the candidate terminal.

A fourth feature of the present invention is summarized as a communication method performed by a radio communication terminal having a communication application installed therein and being capable of executing direct communication with another radio communication terminal without involving a radio access network, and a phonebook server configured to manage first phonebook data containing an identifier of the other radio communication terminal and being associated with the radio communication terminal, the method including the steps of: the phonebook server acquiring the first phonebook data; the phonebook server acquiring a location of the other communication terminal contained in the first phonebook data acquired; generating second phonebook data containing an identifier of a candidate terminal capable of direct communication, based on the acquired location of the other radio communication terminal; sending the radio communication terminal the second phonebook data generated by the phonebook data generation unit; the radio communication terminal receiving the second phonebook data from the phonebook server; and executing direct communication with a counterpart terminal indicated in a communication request from the communication application, when the counterpart terminal is contained in the second phonebook data as the candidate terminal.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of the Radio Communication System

Figure 1:
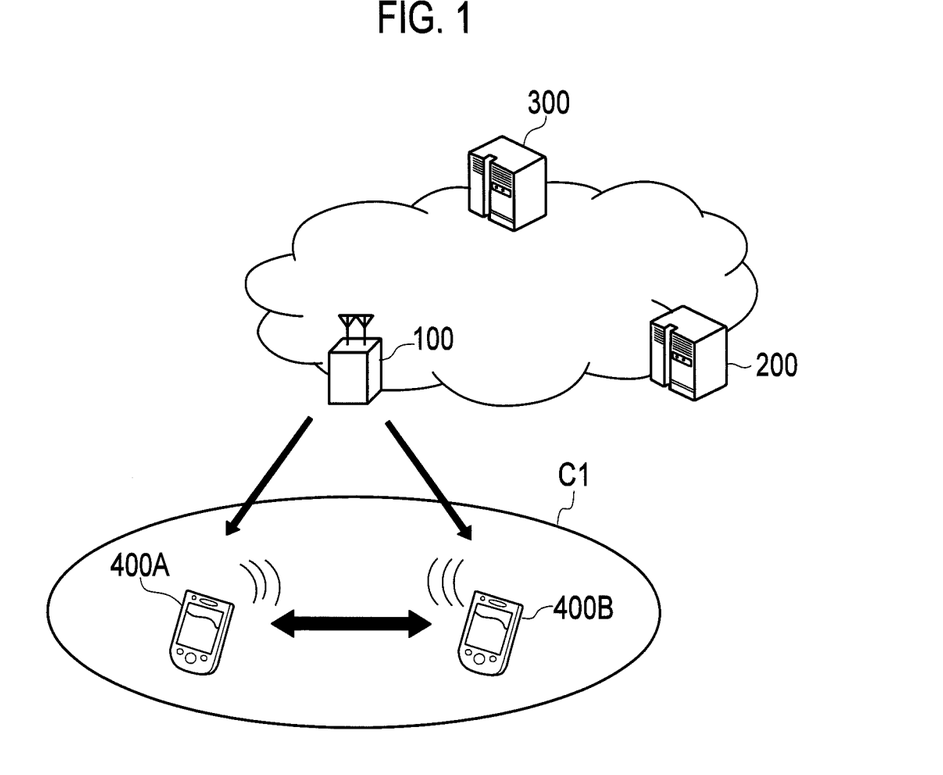
FIG. 1 is an overall schematic configuration diagram of a radio communication system 10 according to an embodiment of the present invention.

FIG. 1 is an overall schematic configuration diagram of a radio communication system 10 according to this embodiment. As shown in FIG. 1, the radio communication system 10 includes a radio base station 100, a communication control apparatus 200, a phonebook server 300, and multiple radio communication terminals 400A, 400B (terminals 400A, 400B hereinbelow).

The radio base station 100 performs operation conforming to a radio access technology (RAT) standardized by 3GPP, e.g., Long Term Evolution (LTE). In this embodiment, the radio base station 100 controls direct communication between the terminals 400A and 400B. More specifically, the radio base station 100 controls the direct communication by causing the radio base station 100 to transmit broadcast information indicating whether or not to permit communication between the terminal 400A and the terminal 400B without involving the radio base station 100, i.e., without involving a radio access network. Note that the broadcast information for controlling direct communication between the terminal 400A and the terminal 400B may be broadcasted separately from multiple radio base stations, e.g., the radio base station 100 and another radio base station (not shown).

In this way, in the radio communication system 10, direct communication between the terminal 400A and the terminal 400B may be permitted based on the broadcast information from the radio access network side. In addition, when it is based on broadcast information from another radio base station (not shown), for example, direct communication may be permitted based on the broadcast information from the other radio base station even in an area not covered by the radio base station 100.

The communication control apparatus 200 manages information on where the terminals 400A, 400B camp on and controls communication executed between the terminal 400A and the terminal 400B. The communication control apparatus 200 also receives an inquiry about current locations of the terminals 400A, 400B sent from the phonebook server 300 and returns the current locations of the terminals 400A, 400B. The communication control apparatus 200 may be, for example, a mobility control apparatus (MME), a policy control apparatus (PCRF), a subscriber management server (HSS), or the like.

The phonebook server 300 manages phonebook data associated with the terminal 400A and phonebook data associated with the terminal 400B. The phonebook server 300 can perform synchronization with phonebook data stored in the terminal 400A, 400B periodically (once a month) for example.

The terminal 400A and the terminal 400B are each a User Equipment (UE) having a communication application installed therein and being configured to execute radio communication conforming to a radio access technology such as LTE. The terminal 400A (400B) can perform communication with the terminal 400B (400A) via the radio base station 100, and can perform direct communication with the terminal 400B (400A) without involving the radio base station 100. Specifically, the terminal 400A, 400B determines whether direct communication is executable or not based on the broadcast information broadcasted from the radio base station 100, and executes direct communication at a predetermined timing or any timing. Note that, for this determination, information notified of by the communication control apparatus 200 (e.g., a direct-communication permission notification) may be added as an element of determination.

(2) Functional Block Configuration of the Radio Communication System

Figure 2:
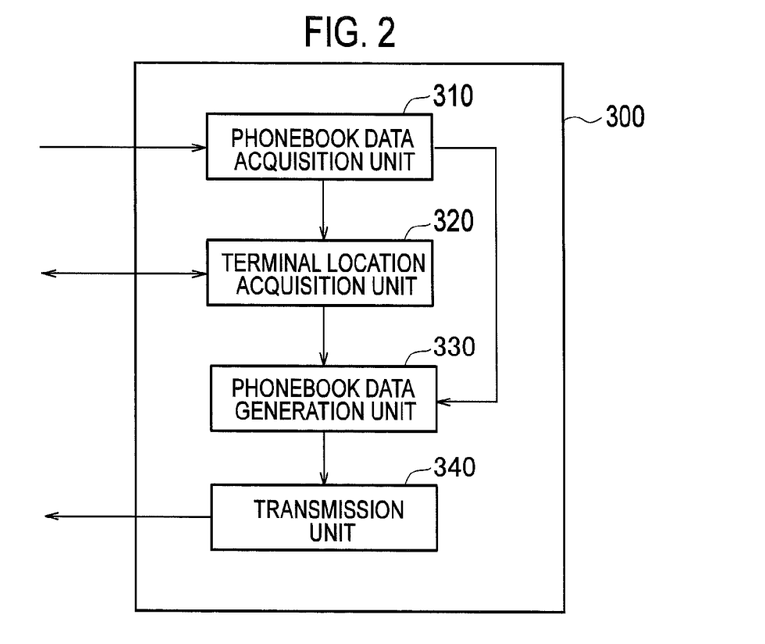
FIG. 2 is a functional block configuration diagram of a phonebook server 300 according to the embodiment of the present invention.
Figure 3:
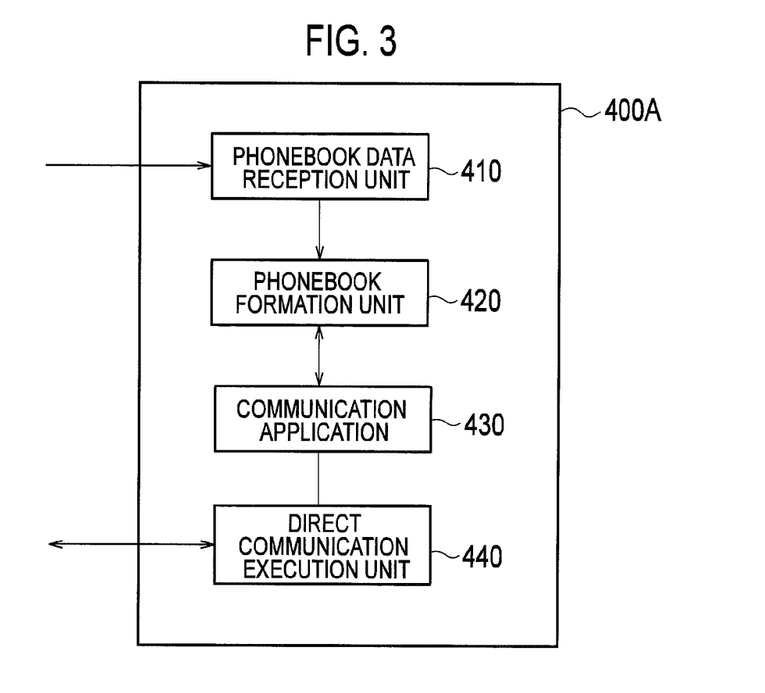
FIG. 3 is a functional block configuration diagram of a terminal 400A according to the embodiment of the present invention.

Next, a functional block configuration of the radio communication system 10 is described. Specifically, functional block configurations of the phonebook server 300 and the terminal 400A are described. FIG. 2 is a functional block configuration diagram of the phonebook server 300. FIG. 3 is a functional block configuration diagram of the terminal 400A.

(2.1) Phonebook Server 300

As shown in FIG. 2, the phonebook server 300 includes a phonebook data acquisition unit 310, a terminal location acquisition unit 320, a phonebook data generation unit 330, and a transmission unit 340.

The phonebook data acquisition unit 310 acquires phonebook data (first phonebook data) retained by the terminal 400A (the terminal 400B). Specifically, via the radio base station 100, the phonebook data acquisition unit 310 acquires the phonebook data containing an identifier of each of other radio communication terminals (telephone number, URI (email address, SIP URI), an IMEI (terminal identification number), an IMSI (subscriber identification number), an S-TMSI (temporary subscriber identification number) and the like.

The terminal location acquisition unit 320 acquires the location of the other communication terminal (specifically the terminal 400B) contained in the phonebook data acquired by the phonebook data acquisition unit 310. Specifically, the terminal location acquisition unit 320 acquires the current location of the other communication terminal from the communication control apparatus 200 by inquiring at the communication control apparatus 200 periodically. The terminal location acquisition unit 320 can determine whether the other communication terminal is located in the periphery of the terminal 400A or not based on a unit such as a cell, a sector, a tracking area, or a network and based on a range in which radio signals by direct communication reach.

The phonebook data generation unit 330 generates phonebook data (second phonebook data) containing an identifier of a candidate terminal capable of direct communication, based on the location of the other radio communication terminal acquired by the terminal location acquisition unit 320. Specifically, the phonebook data generation unit 330 determines that the other radio communication terminal is a candidate terminal capable of direct communication, when the location of the other radio communication terminal acquired by the terminal location acquisition unit 320 is within a range of a predetermined distance from the location of the terminal 400A. The phonebook data generation unit 330 generates phonebook data constituted by the identifier of the radio communication terminal determined as being a candidate terminal.

The transmission unit 340 sends the terminal 400A the phonebook data generated by the phonebook data generation unit 330. The transmission of the phonebook data may be triggered by communication control such as communication execution or location registration of the terminal 400A.

(2.2) Terminal 400A

As shown in FIG. 3, the terminal 400A includes a phonebook data reception unit 410, a phonebook formation unit 420, a communication application 430, and a direct communication execution unit 440. Note that the terminal 400B also has a similar functional block configuration to that of the terminal 400A.

The phonebook data reception unit 410 receives the phonebook data (second phonebook data) generated by the phonebook server 300. Specifically, the phonebook data reception unit 410 receives the phonebook data via the radio base station 100 or other network (such as a wireless LAN).

Based on the phonebook data received by the phonebook data reception unit 410, the phonebook formation unit 420 forms a phonebook in which a candidate terminal capable of direct communication with the terminal 400A is identifiable. Specifically, the phonebook formation unit 420 adds information to the phonebook data (first phonebook data) retained by the terminal 400A, the information indicating that the terminal 400A can execute direct communication with a candidate terminal.

The communication application 430 is a communication application installed in the terminal 400A. For example, the communication application 430 is an application which can be provided both through direct communication and via the radio access network, and is, for example, an application for making voice calls, sending instant messages (IMs), or the like. Further, the communication application 430 may be an application operated only through direct communication.

When a counterpart terminal (e.g., the terminal 400B) indicated in a communication request from the communication application 430 is contained as a candidate terminal in the phonebook data received by the phonebook data reception unit 410, the direct communication execution unit 440 executes direct communication with the counterpart terminal.

(3) Operation of the Radio Communication System

Next, operation of the above-described radio communication system 10 is described. Specifically, a description is given of operation of the terminal 400A executing direct communication with the terminal 400B based on phonebook data generated by the phonebook server 300.

Figure 4:
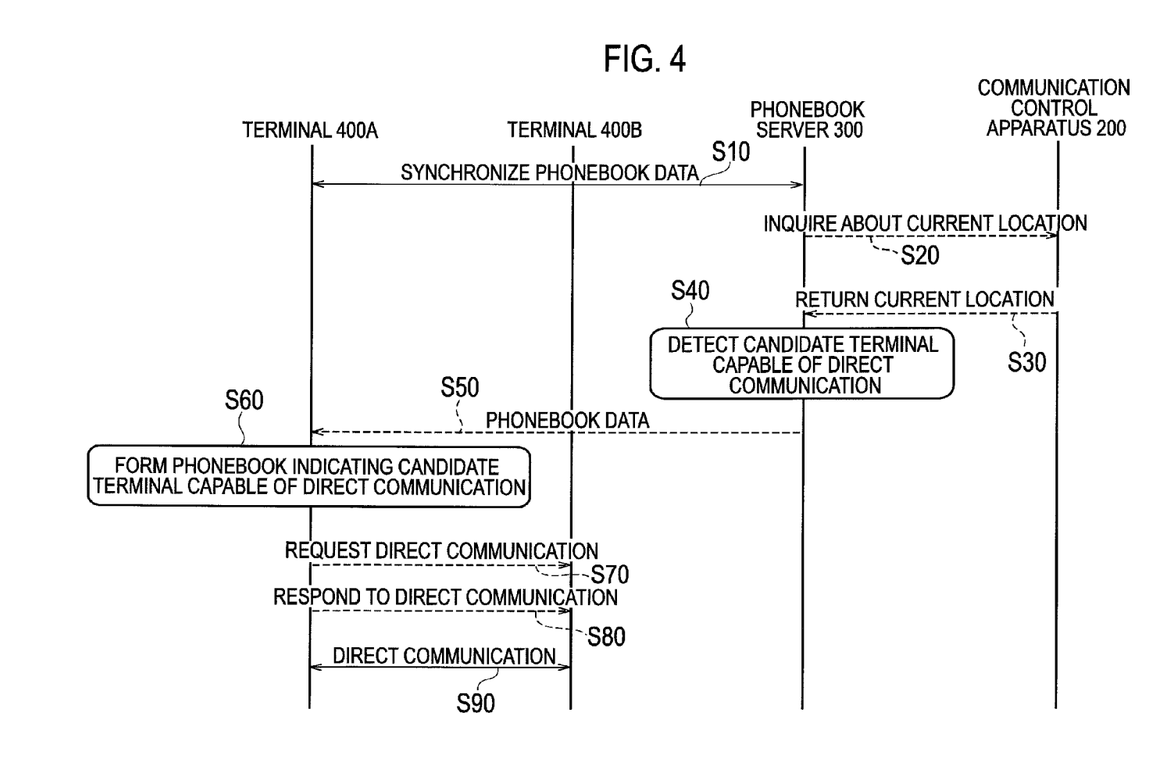
FIG. 4 is a communication sequence in which the terminal 400A executes direct communication with a terminal 400B by using phonebook data, according to the embodiment of the present invention.

FIG. 4 shows a communication sequence in which the terminal 400A executes direct communication with the terminal 400B by using phonebook data. As shown in FIG. 4, the phonebook server 300 and the terminal 400A perform synchronization of phonebook data retained by the terminal 400A (S10).

The phonebook server 300 inquires at the communication control apparatus 200 about the location of a cell or the like where the other terminal (the terminal 400B) contained in the synchronized phonebook data camps (current location) (S20). Based on the inquiry, the communication control apparatus 200 detects the current location of the terminal 400B, and responds to the phonebook server 300 with the detected current location of the terminal 400B (S30).

Based on a result of the response from the communication control apparatus 200, the phonebook server 300 detects a candidate terminal capable of direct communication with the terminal 400A (S40). The phonebook server 300 determines whether direct communication is possible or not based on, as described above, a distance between the terminal 400A and the terminal 400B or the like. The phonebook server 300 sends the terminal 400A phonebook data containing the identifier of the candidate terminal (S50).

Based on the phonebook data received from the phonebook server 300, the terminal 400A forms a phonebook in which the candidate terminal capable of direct communication is identifiable (S60). Specifically, the terminal 400A adds information to the phonebook data (first phonebook data) retained by the terminal 400A, the information indicating that the terminal 400A can execute direct communication with the candidate terminal.

The terminal 400A determines, based on the phonebook data, that the terminal 400B is a candidate terminal and is capable of direct communication, and thus requests direct communication with the terminal 400B (S70). The terminal 400B responds to the request for direct communication from the terminal 400A (S80), and thus direct communication between the terminal 400A and the terminal 400B starts (S90).

(4) Advantageous Effects

According to the radio communication system 10, the phonebook server 300 generates phonebook data (second phonebook data) containing the identifier of a candidate terminal capable of direct communication, based on the location of the radio communication terminal (current location). Further, when a counterpart terminal indicated in a communication request from the communication application 430 is contained in the phonebook data as a candidate terminal, the terminal 400A (the terminal 400B) executes direct communication with the counterpart terminal. Thus, the communication application 430 can speedily find out whether device-to-device direct communication (D2D communication) is possible or not in a case where the D2D communication is to be executed by using a radio access network such as LTE.

In other words, the user of the terminal 400A can find a radio communication terminal capable of D2D communication speedily and easily. In addition, since terminals capable of direct communication are extracted as candidate terminals in advance, the terminal 400A can avoid unnecessary terminal-finding processing. Hence, time required to start direct communication and related processing load can be reduced.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, in the above embodiment of the present invention, the location of the terminal 400A (400B) is acquired through identification of a cell, a sector, a tracking area, or a network as the location. Besides these, the location in the present invention may be acquired using GPS (Global positioning system) information sent from the terminal or beacon information on a wireless LAN base station received by the terminal (including location information on the wireless LAN base station obtained based on beacon information). Such information on location may be sent to the communication control apparatus 200 and stored, may be sent to a location information management server (not shown) and stored, or may be sent to the phonebook server 300 and stored in the phonebook server 300.

In other words, any mode can be employed as long as the phonebook server 300 can use such information on location when detecting a candidate terminal capable of direct communication. The phonebook server 300 may acquire such information at any timing or periodically when the terminal transmits it at the same time as synchronization of the phonebook data or upon receipt of the GPS information or the beacon information on the wireless LAN base station, or may acquire such information when the terminal transmits it in response to an inquiry from the phonebook server 300, the communication control apparatus 200, or the position information management server.

Further, the phonebook server 300 may cooperate with the HSS, the MME, or the like, so that the HSS or the MME updates the location information on each terminal in the phonebook data, triggered by communication control such as communication execution or position registration of the terminal. In this case, the notification frequency may follow a predetermined rule (e.g., leaving 10 or more minutes between notifications) for load reduction. In addition, information indicating whether a terminal subscribes to direct communication service or not may be added as an element of determination on whether direct communication is possible or not. In a case of employing such a method, when phonebook data (first phonebook data) retained by the terminal 400A is inputted, phonebook data (second phonebook data) is generated, the phonebook data containing the identifier of a candidate terminal capable of direct communication and having location information on the terminal reflected therein.

Figure 5:
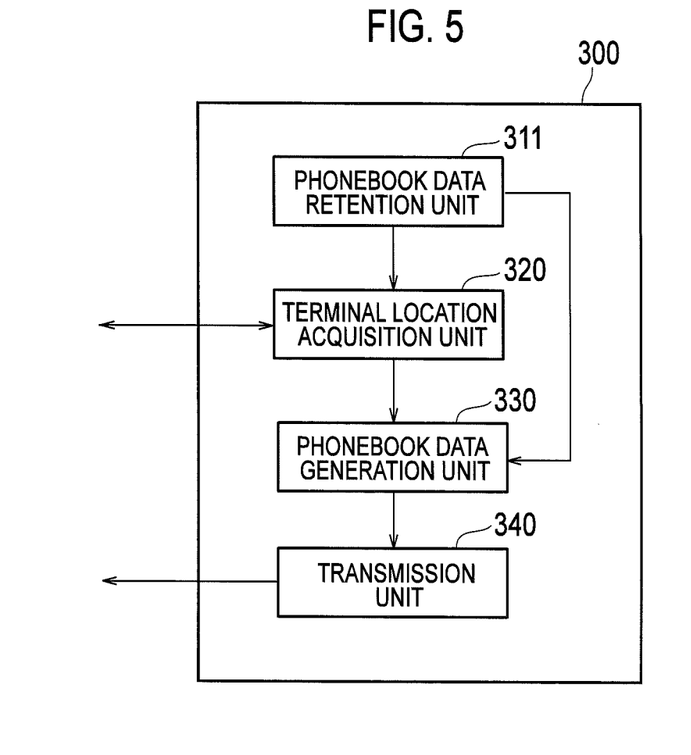
FIG. 5 is a functional block configuration diagram of the phonebook server 300 according to a modification of the present invention.

For example, although the terminal 400A retains phonebook data in the example described in the above embodiment of the present invention, the phonebook data may be retained by the phonebook server 300. FIG. 5 is a functional block configuration diagram of the phonebook server 300 according to a modification of the present invention.

As shown in FIG. 5, the phonebook server 300 includes a phonebook data retention unit 311 in place of the phonebook data acquisition unit 310. The phonebook data retention unit 311 retains phonebook data associated with the terminal 400A. The terminal location acquisition unit 320, the phonebook data generation unit 330, and the transmission unit 340 have the same functions as those described in the above embodiment.

Figure 6:
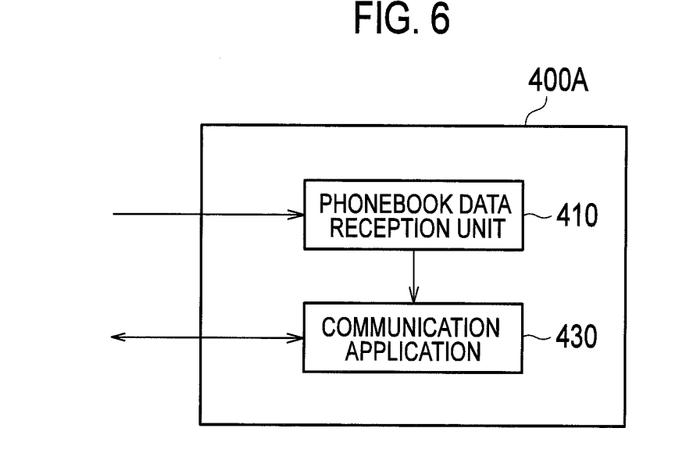
FIG. 6 is a functional block configuration diagram of the terminal 400A according to the modification of the present invention.

FIG. 6 is a functional block configuration diagram of the terminal 400A according to a modification of the present invention. As shown in FIG. 6, in a case where the phonebook data is retained by the phonebook server 300, the terminal 400A includes the phonebook data reception unit 410, the communication application 430, and the direct communication execution unit 440, and the terminal 400A executes direct communication with another terminal by referring to phonebook data received by the phonebook data reception unit 410 from the phonebook server 300. Note that the phonebook server 300 may provide the phonebook data to the terminal 400A in response to every communication request from the communication application 430, or the terminal 400A may download the phonebook data periodically from the phonebook server 300.

As described above, the present invention naturally includes various embodiments which are not described herein. Accordingly, the technical scope of the present invention should be determined only by the matters to define the invention in the scope of claims regarded as appropriate based on the description.

The features of the present invention may also be expressed as follows. A first feature of the present invention is summarized as a communication system including: a terminal 400A (a radio communication terminal) having a communication application 430 installed therein and being capable of executing direct communication with a terminal 400B (another radio communication terminal) without involving a radio access network; and a phonebook server 300 configured to manage first phonebook data containing an identifier of the other radio communication terminal and being associated with the radio communication terminal. Here, the phonebook server includes a phonebook data acquisition unit 310 configured to acquire the first phonebook data, a terminal location acquisition unit 320 configured to acquire a location of the other communication terminal contained in the first phonebook data acquired by the phonebook data acquisition unit, a phonebook data generation unit 330 configured to generate second phonebook data containing an identifier of a candidate terminal capable of direct communication, based on the location of the other radio communication terminal acquired by the terminal location acquisition unit, and a transmission unit 340 configured to send the radio communication terminal the second phonebook data generated by the phonebook data generation unit. And, the radio communication terminal includes a phonebook data reception unit 410 configured to receive the second phonebook data from the phonebook server, and a direct communication execution unit 440 configured to execute direct communication with a counterpart terminal indicated in a communication request from the communication application, when the counterpart terminal is contained in the second phonebook data as the candidate terminal.

A second feature of the present invention is summarized as a phonebook server which manages first phonebook data associated with a radio communication terminal having a communication application installed therein and being capable of executing direct communication with another radio communication terminal without involving a radio access network, the phonebook server including: a phonebook data acquisition unit configured to acquire the first phonebook data containing an identifier of the other radio communication terminal; a terminal location acquisition unit configured to acquire a location of the other communication terminal contained in the first phonebook data acquired by the phonebook data acquisition unit; a phonebook data generation unit configured to generate second phonebook data containing an identifier of a candidate terminal capable of direct communication, based on the location of the other radio communication terminal acquired by the terminal location acquisition unit; and a transmission unit configured to send the radio communication terminal the second phonebook data generated by the phonebook data generation unit.

A third feature of the present invention is summarized as a radio communication terminal having a communication application installed therein and being capable of executing direct communication with another radio communication terminal without involving a radio access network, the radio communication terminal including: a phonebook data reception unit configured to receive the second phonebook data from the phonebook server, the second phonebook data containing an identifier of a candidate terminal capable of direct communication with the radio communication terminal; and a direct communication execution unit configured to execute direct communication with a counterpart terminal indicated in a communication request from the communication application, when the counterpart terminal is contained in the second phonebook data as the candidate terminal.

In the third feature of the present invention, the radio communication terminal may include a phonebook formation unit 420 configured to use the second phonebook data to form a phonebook in which the candidate terminal capable of direct communication is identifiable.

A fourth feature of the present invention is summarized as a communication method performed by a radio communication terminal having a communication application installed therein and being capable of executing direct communication with another radio communication terminal without involving a radio access network, and a phonebook server configured to manage first phonebook data containing an identifier of the other radio communication terminal and being associated with the radio communication terminal, the method including the steps of: the phonebook server acquiring the first phonebook data; the phonebook server acquiring a location of the other communication terminal contained in the first phonebook data acquired; generating second phonebook data containing an identifier of a candidate terminal capable of direct communication, based on the acquired location of the other radio communication terminal; sending the radio communication terminal the second phonebook data generated by the phonebook data generation unit; the radio communication terminal receiving the second phonebook data from the phonebook server; and executing direct communication with a counterpart terminal indicated in a communication request from the communication application, when the counterpart terminal is contained in the second phonebook data as the candidate terminal.

Note that the entire content of Japanese Patent Application No. 2012-100277 (filed on Apr. 25, 2012) is incorporated by reference in the present specification.

INDUSTRIAL APPLICABILITY

According to the aspects of the present invention, what can be provided are a communication system, a phonebook server, a radio communication terminal, and a communication method capable of causing a communication application to speedily find out whether D2D communication is possible or not in a case where the D2D communication is to be executed by using a radio access network.

EXPLANATION OF THE REFERENCE NUMERALS

10 radio communication system
100 radio base station
200 communication control apparatus
300 phonebook server
310 phonebook data acquisition unit
311 phonebook data retention unit
320 terminal location acquisition unit
330 phonebook data generation unit
340 transmission unit
400A, 400B terminal
410 phonebook data reception unit
420 phonebook formation unit
430 communication application
440 direct communication execution unit

The invention claimed is:

1. A communication system comprising:
a radio communication terminal having a communication application installed therein and executing direct communication with another radio communication terminal without involving a radio access network; and
a phonebook server configured to manage first phonebook data containing an identifier of the other radio communication terminal and being associated with the radio communication terminal, wherein
the phonebook server includes
a phonebook data acquisition circuit that acquires the first phonebook data,
a terminal location acquisition circuit that acquires a location of the other radio communication terminal contained in the first phonebook data acquired by the phonebook data acquisition circuit,
a phonebook data generation circuit that generates second phonebook data containing an identifier of a candidate terminal capable of direct communication with the radio communication terminal, based on the location of the other radio communication terminal acquired by the terminal location acquisition circuit, and
a transmission circuit that sends the radio communication terminal the second phonebook data generated by the phonebook data generation circuit, and the radio communication terminal includes a phonebook data reception circuit that receives the second phonebook data from the phonebook server, and a direct communication execution circuit that executes direct communication with a counterpart terminal indicated in a communication request from the communication application, when the counterpart terminal is contained in the second phonebook data as the candidate terminal.

2. A phonebook server which manages first phonebook data associated with a radio communication terminal having a communication application installed therein and executing direct communication with another radio communication terminal without involving a radio access network, the phonebook server comprising:

a phonebook data acquisition circuit that acquires the first phonebook data containing an identifier of the other radio communication terminal;

a terminal location acquisition circuit that acquires a location of the other radio communication terminal contained in the first phonebook data acquired by the phonebook data acquisition circuit;

a phonebook data generation circuit that generates second phonebook data containing an identifier of a candidate terminal capable of direct communication, based on the location of the other radio communication terminal acquired by the terminal location acquisition circuit; and a transmission circuit that sends the radio communication terminal the second phonebook data generated by the phonebook data generation circuit.

3. A radio communication terminal having a communication application installed therein and executing direct communication with another radio communication terminal without involving a radio access network, the radio communication terminal comprising:

a phonebook data reception circuit that receives a phonebook data from a phonebook server, the phonebook data containing an identifier of a candidate terminal capable of direct communication with the radio communication terminal; and a direct communication execution circuit that executes direct communication with a counterpart terminal indicated in a communication request from the communication application, when the counterpart terminal is contained in the phonebook data as the candidate terminal.

4. The radio communication terminal according to claim 3, further comprising a phonebook formation circuit that uses the phonebook data to form a phonebook in which the candidate terminal directs communication is identifiable.

5. A communication method performed by a radio communication terminal having a communication application installed therein and executing direct communication with another radio communication terminal without involving a radio access network, and a phonebook server configured to manage first phonebook data containing an identifier of the other radio communication terminal and being associated with the radio communication terminal, the method comprising the steps of:

the phonebook server acquiring the first phonebook data;

the phonebook server acquiring a location of the other radio communication terminal contained in the first phonebook data acquired;

generating second phonebook data containing an identifier of a candidate terminal capable of direct communication with the radio communication terminal, based on the acquired location of the other radio communication terminal;

sending the radio communication terminal the second phonebook data generated by the phonebook server;

the radio communication terminal receiving the second phonebook data from the phonebook server; and executing direct communication with a counterpart terminal indicated in a communication request from the communication application, when the counterpart terminal is contained in the second phonebook data as the candidate terminal.

\* \* \* \* \*